Fig. 7

INVENTORS.
LAWRENCE A. BUSBY
CHARLES A. BUCHER, JR.
FRANK M. BRAUER
BY Alden D. Redfield
Charles M. Hogan
ATTORNEYS.

INVENTORS.
LAWRENCE A. BUSBY
CHARLES A. BUCHER, JR.
FRANK M. BRAUER

BY Alden D. Redfield
Charles M. Hogan
ATTORNEYS.

EMITTER OUTPUT OF 67; RISE TIME = 2 MS
FALL TIME-CONSTANT APPROX. = 100 MS

Fig 6

STEP VOLTAGE AT CENTER ARM OF POT. 95
NECESSARY TO TURN ON 97

Fig 7

CHANGING VOLTAGE CURVE AT EMITTER OF 97
AS TRANSISTOR 97 STARTS TO CONDUCT.
TIME CONSTANT OF CURVED PART APPROX. = 0.1 SEC.

Fig 8

CHANGE IN VOLTAGE LEVEL AT COLLECTOR OF 97
AS TRANSISTOR 97 STARTS TO CONDUCT.
TIME CONSTANT APPROX. = 0.1 SEC.

Fig 9

VOLTAGE LEVEL AT JUNCTION OF DIODE 111
AND CAPACITOR 110. WITH 97 OFF, VOLTAGE = 5.0v
WHEN 97 IS ON IT = 1.2v

Fig 10

VOLTAGE AT COLLECTOR OF 109 WHEN 97 STARTS
TO CONDUCT. TRANSISTOR 109 COMES ON FULL
IN APPROX. 0.025 SEC.

Fig 11

VOLTAGE DROP FROM BASE OF 109
ACROSS RESISTOR 112 AS TRAN-
SISTOR 97 TURNS ON THEN IS
LATER CUT OFF AGAIN.

Fig 12

INVENTORS.
LAWRENCE A. BUSBY
CHARLES A. BUCHER, JR.
FRANK M. BRAUER
BY *Alden W. Redfield*
*Charles M. Hogan*
ATTORNEYS.

United States Patent Office 3,325,738
Patented June 13, 1967

3,325,738
SIGNAL TO NOISE RATIO CONTROLLED
SQUELCH CIRCUIT
Lawrence A. Busby, Charles A. Bucher, Jr., and Frank M. Brauer, Cincinnati, Ohio, assignors to Avco Corporation, Cincinnati, Ohio, a corporation of Delaware
Filed Feb. 17, 1964, Ser. No. 345,299
22 Claims. (Cl. 325—477)

ABSTRACT OF THE DISCLOSURE

This is a signal-noise discriminator of particular utility in a single sideband receiver. Several portions of the spectrum are separated by filter networks, each coupled to an envelope detector. Each envelope detector furnishes a sample of energy in its associated channel. Noise powers are equated at the outputs of the filter networks. All envelope detectors are coupled to a gate circuit which recognizes the minimum output and to another gate circuit which recognizes the maximum output. The maximum and minimum outputs are differentially combined to arrive at a resultant signal which is utilized to disable a squelch gate and permit signal reception. This occurs when the resultant attains a certain threshold level. When the squelch gate is disabled that level is automatically lowered. Additionally, when the squelch gate is disabled clock means keeps it disabled for a predetermined time period.

The present invention relates to dicision-making circuits, and it provides an automatic signal-versus-noise decision-making device which, although not limited thereto, is particularly suited for use as a noise squelch circuit in single sideband (SSB) radio receiving equipment. The invention is of general utility in receivers designed to accept other types of carrier modulation, and it is useful in the processing of any signals whose energy-frequency spectrum is changing at a rate lower than the rate of change of the energy-frequency spectrum of noise.

The invention is premised on a realization that separate measurement of signal and noise can be accomplished when the signal spectral density and the noise spectral density are different and known. In the specific embodiment herein disclosed in detail, the input signal comprises audio intelligence and noise. Two voltages are derived by utilizing characteristics of these signals. One voltage is proportional to noise, and the other is proportional to signal plus noise. The two voltages are applied to a differential amplifier which is adjusted to provide an output when the signal plus noise exceeds the noise by a predetermined amount. This output actuates an audio gate in accordance with the input signal-to-noise ratio. Peak signal-to-noise ratio conditions are employed to cause a squelch gate to pass audio signals, and hold and feedback hysteresis circuitry are exploited to maintain its operation. The operating point of the squelch depends on signal-to-noise ratio and not on the magnitude of the aforementioned voltages. This is a highly desirable feature.

The embodiment of the invention herein disclosed functions automatically to gate a receiver into reception in the presence of usable signals. This gating is dynamically accomplished by circuitry which functions in such a manner as to discern a difference between a power spectral analysis of in-band signal plus noise and a power spectral analysis of in-band noise alone, analysis being made whether carrier signals are present or not.

The invention comprises circuit means for determining when the signal is sufficiently distinctive from noise to be usable. That is, the invention detects characteristic differences between noise and intelligence, and it also includes means for utilizing the difference data to gate the receiver into reception when a preset signal-to-noise ratio is attained.

The circuitry further includes a circuit means for holding the receiver gated in receiving condition for a predetermined period after the usable signal has dropped out or disappeared. Further, the "hold" time after signal cessation is automatically controlled in such a manner as to remain essentially constant. When the threshold level requisite to gating the receiver into receiving condition is attained, it is automatically depressed in order to keep the receiver in that condition.

A consideration of the prior art is convincing of a preexisting need for a truly effective system for differentiating between the presence of signal plus noise and the presence of noise alone in the audio section of a single sideband receiver. The demodulated output of such a receiver consists of noise alone when the modulation components are not present. This follows from the nature of single sideband, there being no received carrier frequency under these circumstances. Consequently, once the transmission of intelligence has ceased for a period in excess of the persistence time of the automatic gain control system in such a receiver, the sensitivity of the radio frequency and intermediate frequency stages of the receiver increases to a maximum, and the output of the detector consists of high-level noise. In the absence of an effective squelch gating circuit of the type provided by the invention, this noise to a greater or lesser degree is passed on to the operator at an objectionable audio level.

Accordingly, a primary object of the invention is to provide a squelch gate control circuit which is not subject to being erroneously triggered by the high background noise level present in a single sideband receiver in the absence of modulation components.

Another object of the invention is to provide an automatic decision-making device or signal-noise discriminator of general utility with carrier modulated signals of all known types. While in the specific embodiment herein shown the received signals are continuously sampled at two selected frequency bands, this showing is by way of illustration and not of limitation, a fulfilled object of the invention being to provide sampling at two or more frequency bands so selected and analyzed as to render the receiver properly responsive, without being adversely affected by pre-emphasis, de-emphasis, or a flat spectrum modulation of intelligence.

A further object of the invention is to provide, in a squelch system, automatically timed, signal reset, or "keep alive" provisions for use in closely spaced intermittent transmissions.

It is also an object of the invention to provide means for automatically depressing the threshold or decision level once the receiver is gated into receiving condition.

For a better understanding of the present invention, together with other and further objects, advantages, and capabilities thereof, reference is made to the following description of the appended drawings, in which:

FIG. 2 is a block diagram of the squelch gate control circuit in accordance with the invention;

FIG. 3 is a schematic circuit of the novel squelch gate control system;

Figure 1:
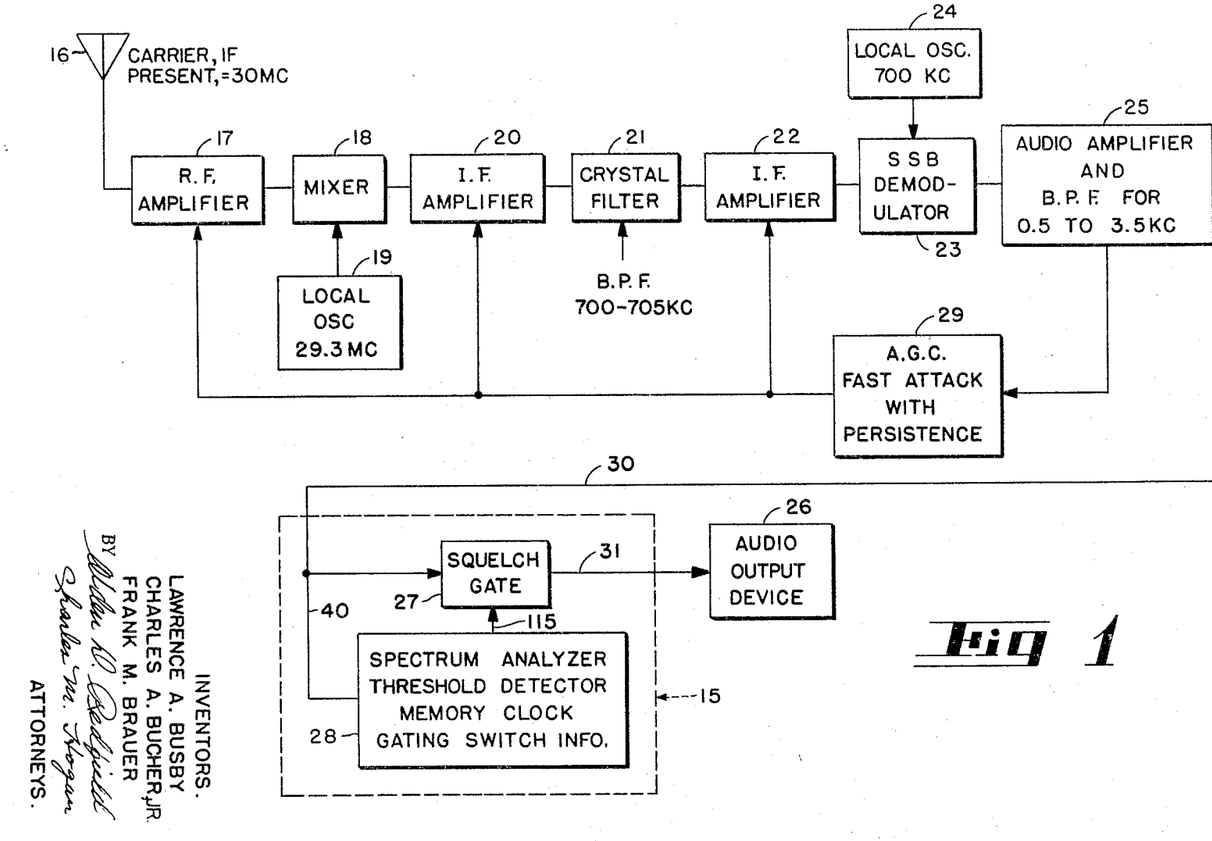
FIG. 1 is a block diagram of a representative single sideband receiver incorporating a squelch gate control circuit in accordance with the invention.

Referring now specifically to FIG. 1, there is shown in block diagram a representative single sideband receiver including a novel squelch gate control circuit in accordance with the invention, it being collectively designated by the reference numeral 15. The diagram is otherwise conventional, and it comprises the following principal units, in cascade: a radio frequency amplifier circuit 17 having an input coupled to the antenna 16; a first mixer circuit for heterodyning the received single sideband down to a predetermined intermediate frequency, this mixer circuit comprising a mixer proper 18 and a first local oscillator 19; a first intermediate frequency amplifier network 20 for providing selectivity and amplification; a band pass filter 21; a second intermediate frequency amplifier network 22; a single sideband demodulator comprising a demodulator proper 23 and a second local oscillator 24; an audio amplifier and band pass filter network 25 coupled to the demodulator; and an audio output device 26, which may comprise a speaker or the like.

Interposed between the audio amplifier and the audio output device or transducer is a squelch gate 27 and novel gate control circuitry 28, described in detail. AGC potential is derived by an automatic gain control system 29 from the audio amplifier system 25 and applied in known fashion to the radio frequency amplifier and the intermediate frequency amplifiers to control their several gains. The input line to the squelch gate 27 is indicated by the reference numeral 30, and the output line of the gate to the transducer is indicated by the reference numeral 31. The area within the block 15 of FIG. 1 and, more specifically, the area enclosed by block 28, is of interest here.

Speaking in gross and making reference to FIG. 2, the circuitry within the blocks designated 32, 33, 34, 35, 36, 37, and 38 performs the function of placing the squelch gate 27 in signal-passing condition or signal-blocking condition at the times and in the manner desired, and it is to this circuitry that attention is now directed, with specific reference to FIG. 2.

The driver amplifier 32 of FIG. 2 comprises the transistor 39 of FIG. 3 and components immediately associated therewith. Audio signal input is applied to transistor 39 via a transformer 40, the secondary 41 of which is in circuit between the base of transistor 39 and the ground point of reference potential, the transformer 40 corresponding to the line or coupling expedient designated 40 in FIG. 2.

Since wide dynamic range is desired, transistor 39 is arranged in the emitter-follower configuration. The base of this NPN-type transistor is supplied with positive bias from the positive terminal 42 of a battery or other suitable source of current, a voltage divider comprising resistors 43 and 44 being connected between terminal 42 and secondary 41, and the junction of these resistors being connected to the base of transistor 39. The collector is biased in the reverse direction by direct connection to the positive voltage supply line 45, which in turn is connected to terminal 42.

The output from driver transistor 39 is taken from its emitter, and it contains the composite signal—i.e., the amplified noise and intelligence that has been passed through the band-limiting audio amplifier stage 25 of FIG. 1. The driver amplifier 32 (FIGS. 2 and 3) functions as a power amplifier which simultaneously couples the composite audio signals to both high and low pass filter networks. These are collectively designated by the reference numeral 33 in FIG. 2 and described in further detail hereinbelow.

Figure 4:
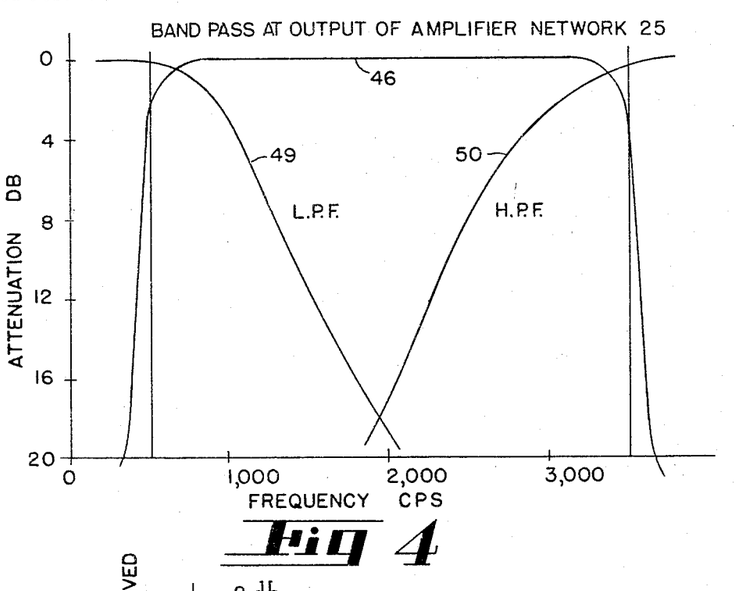
FIG. 4 is a set of filter bandpass characteristics employed as an aid in describing the invention.

Before continuing with a detailed description of FIG. 3, it is in order parenthetically to refer to the band pass filter characteristics illustrated in FIG. 4. The curve designated by the reference numeral 46 is the over-all band pass filter characteristic of the receiver through the single sideband demodulator 23 and audio amplifier and filter network 25 (FIG. 1).

Again making brief reference to FIG. 3, it will be noted that the driver amplifier works into a low pass filter circuit collectively designated 47, and a high pass filter network collectively designated 48. The band pass characteristics of these two circuits are graphed in FIG. 4 and designated by the reference numerals 49 and 50, respectively.

Examination of FIG. 4 discloses that the area between the attenuation or characteristic curve 49 for the low pass filter and the low (approximately 500 cycles per second) side of the band pass characteristic 46 is equal to the area bounded by the attenuation or characteristic curve 50 for the high pass filter and the high (3500 cycles per second) side of the curve 46. Noise having a flat power spectrum at the output of the driver amplifier 32 (i.e., the emitter of transistor 39) divides equally on a power basis between the low pass and the high pass filter networks 47 and 48 (FIG. 3). In the particular embodiment of the invention now under discussion, the noise spectrum is essentially flat or "white" within the pass band 46. That is, in the particular embodiment here disclosed for purposes of illustration, filter 47 attenuates the input signal 3 decibels at 1000 cycles per second, and 20 decibels at 2000 cycles per second. The high pass filter 48 attenuates the input signal 20 decibels at 1900 cycles per second, and 3 decibels at 3000 cycles per second. The half power points of curve 46 are disposed at 500 cycles per second on the low frequency side, and 3500 cycles per second on the high frequency side.

One of the important aspects of the present invention resides in the fact that, in receivers which do not have a flat frequency response of the character indicated by 46, the attenuation characteristics of the low and high pass filter networks 47 and 48 should be designed in such fashion that equal noise power is present at the output of each filter network when the input to the receiver antenna is comprised of white noise. This law being laid down in accordance with the teachings of the invention, those of ordinary skill in the art, with the benefit of such teaching, will know how to design the filters for particular applications. Unequal transfer losses in the filter networks can be compensated for by gain adjustments in the system. The novel principle taught and implemented by the invention is the supply of equal amplitude power from each filter network, such as 47 and 48, to its respective cascaded detector network. Under those circumstances, when only band limited white noise is present at the input to the driver amplifier, the observance of this principle prevents false triggering of the squelch gating circuit by purely noise power spectral differences, the invention being directed to the objective of confining such triggering to a response to the difference between signal plus noise and noise powers.

It will be seen from the foregoing that equal noise powers appear at the outputs 51 and 52 (FIG. 3) of the filter networks.

Parenthetically, a brief description of the filter networks is now in order. The emitter output of the driver amplifier transistor 39 is coupled to the low pass filter via capacitor 53 and series resistor 54, the low pass filter comprising shunt capacitor 55, series inductor 56, shunt capacitor 57, damping resistor 58, and series filter output capacitor 59. The filter networks are essentially in parallel so far as the output of the driver amplifier stage is concerned. That stage is coupled, via capacitor 53 and series resistor 117, to the high pass filter 48, the latter comprising shunt inductor 60, series capacitor 61, shunt inductor 62, series capacitor 63, damping resistor 64, and output capacitor 65.

The description now proceeds to the amplifier-detector networks connected to the outputs of the just-described filters. Transistors 66 and 67, together with their associated components, amplify and envelope-detect the output of the low pass filter 47. Similarly, transistors 68 and 69, in conjunction with their associated components, amplify and envelope-detect the output of the high pass filter 48. Transistors 66 and 68 are arranged as degenerative common emitter stages.

Figure 6:
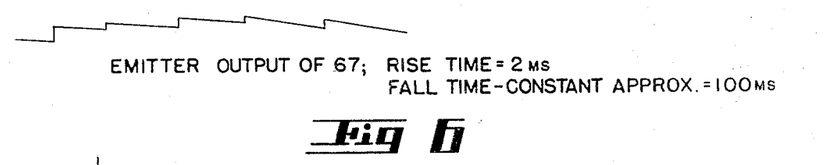
FIGS. 6, 7, 8, 9, 10, 11, and 12 are wave forms to which reference is made in the detailed description of the operation of the invention.

The outputs from transistor stages 66 and 68 comprise audio frequency intelligence components, together with the band limited noise which has been passed by the low and high pass filters, respectively. These components are applied to transistors 67 and 69, respectively, which function as amplitude modulation envelope detectors or infinite impedance detectors. The outputs from transistors 67 and 69 comprise direct current components (illustrated as to wave form in FIG. 6, for transistor 67).

The base of NPN transistor 66 is connected to the junction between two resistors 70 and 71, which comprise a voltage divider between positive line 45 and ground. The collector of this NPN transistor is reverse-biased by a connection to line 45 through resistor 72. An emitter load resistor 73 is connected between its emitter and ground. The collector of NPN transistor 66 is coupled to the base of NPN transistor 67 by a capacitor 74.

The base of NPN transistor 67 is connected to the junction between two resistors 75 and 76, which comprise a voltage divider between positive line 45 and ground. The collector of this NPN transistor is reverse-biased by a direct connection to line 45. An emitter load resistor 77 is connected between its emitter and ground. Resistor 77 is paralleled by a capacitor 78.

Referring now to the amplifier detector network including transistors 68 and 69, the base of NPN transistor 68 is connected to the junction between two resistors 79 and 80, which comprise a voltage divider between positive line 45 and ground. The collector of this NPN transistor 68 is reverse-biased by a connection to line 45 through resistor 81. Emitter load resistor 82 is connected between its emitter and ground. The collector of NPN transistor 68 is coupled to the base of NPN transistor 69 by capacitor 83.

The base NPN transistor 69 is connected to the junction between two resistors 84 and 85, which comprise a voltage divider between positive line 45 and ground. The collector of this NPN transistor is reverse-biased by a direct connection to line 45. An emitter load resistor 86 is connected between the emitter of transistor 69 and ground. Resistor 86 is paralleled by a capacitor 87. Note is made of the fact that the low pass filter 47 and the amplifier-detector network in cascade therewith are in parallel, at the output of the driver amplifier, with the high pass filter 48 and the amplifier-detector network in cascade with the high pass filter.

The outputs at the emitters of transistors 67 and 69 provide the basis for an accurate decision as to whether the wave form output from the amplifier network 25 (FIG. 1) contains signal plus noise, or noise alone.

Evaluation of the spectral characteristics of speech shows why such identification is possible. The phonetic pattern of speech has been studied by others, and many reports on the subject exist in the literature. For example, see a paper by H. Dudley and S. Balashek entitled "Automatic Recognition of Phonetic Patterns in Speech" which appeared in the Journal of the Acoustical Society of America, volume 30, August 1958.

Basically, there are three main phonetic parameters of the speech wave train. Foremost, there are the vowel portions of word formants wherein speech resonances predominate. Second, there are the fricatives where broad distributions of semi-random energy exist; and, third, the plosives which contain sharp bursts of energy.

The speech wave train made up of formants, fricatives, and plosives has most of its spectral energy concentrated below 1000 cycles per second. A measurable portion is present in the 1000–2000 cycles per second band, and some additional energy exists at frequencies above 2000 cycles per second. For example, a male subject producing the diphthong sound "ae" was found to have spectral energy elements above 2000 cycles per second at least 20 decibels down from the energy levels at 500–700 cycles per second.

Consideration of FIG. 4 establishes that speech signals coming out of the amplifier network 25 divide differently at the low and high pass filter networks 47 and 48. Excluding the effects of noise, the output of detector 67 is materially higher or lower than the output of detector 69, dependent on the nature of the signals being received. Supposing that the signal comprises a persistent utterance of the diphthong sound "ae," as mentioned above, then the output of detector 67 would be materially higher than the output of detector 69. Thus supposition involves a substantially fixed condition. Under actual conditions voice signals are quite complex, and the energy-frequency spectrum of the signals is changing. Under actual dynamic conditions, therefore, the output of detector 67 is at times higher and at times lower than the output of detector 69.

As previously mentioned, the constants of the high and low pass filter networks are chosen so that each would pass equal amounts of noise energy when the input to the receiver consists of white noise alone.

When the receiver input is due to noise alone, the D-C voltage across the capacitor 78 will approximately equal the D-C voltage across the capacitor 87. Whenever voice signal data are present at the receiver input, even though considerable noise is also present, the D-C voltage level at the emitter of transistor 67 is higher or lower than the D-C level present at the emitter of transistor 69, according to the spectral energy content of individual spoken syllables.

The time constants of the resistance-capacitance networks 77–78 and 86–87 are chosen such that they approximate the syllabic rate of the spoken word.

The outputs of transistors 67 and 69 change when voice signals are present, and the invention exploits this variation. This is accomplished by a minimum-maximum or "min.-max." threshold level detector which comprises diodes 88, 89, 90, and 91, and a differential amplifier which comprises transistors 97 and 98. Diodes 88 and 90 are poled with their anodes separately connected to the emitter of transistor 67 and the emitter of transistor 69, respectively, and with their cathodes connected together and to a terminal 92, all in such fashion that these two diodes, functioning as an "or" circuit, sense only the maximum signal passing through the two filter channels. Diodes 89 and 91 are poled with their cathodes connected to the emitters of transistors 67 and 69, respectively, and their anodes connected to a common terminal 93, all in such manner that diodes 89 and 91, functioning as an "or" circuit, sense only the minimum signal passing through the two frequency channels.

Connected between the "min." output terminal 93 and line 45 is a resistor 94. Connected between the "max." output terminal 92 and ground is a resistor 95, the latter being arranged as a potentiometer with an adjustable contact 96 in order that the two inputs to the differential amplifier circuit presently described may be appropriately balanced. Note is parenthetically made of the fact that the transistor 97 is in the absence of signals cut off and transistor 98 is conducting, and the voltage at point 92 is approximately equal to the voltage at point 93 with noise input. The base of transistor 98 is provided with a positive bias because of being encircuited with line 45 through resistor 94. The base of transistor 97 is on the "max." side of the differential amplifier network, and the base of transistor 98 is on the "min." side of the differential amplifier network.

Referring to the expression "appropriately balanced" used in the preceding paragraph, it will be noted that the full voltage available across resistor 95 is not applied to the base of transistor 97. By reason of the positioning of contact 96, a part of this voltage (approximately 0.8 in an embodiment actually reduced to practice) is applied to the base of transistor 97 in order to keep noise alone from turning that transistor on. Since the voltage across resistor 95 is positive, the more that contact 96 is tapped down, the greater will be the required signal-to-noise ratio to turn transistor 97 on. The point is that, even when noise alone is present, a "min." output is applied from point 93 to transistor 98, and a "max." output is applied from contact 96 to transistor 97. It is desired that the differential amplifier not respond to the difference between the "max." and the "min." characteristic of noise only. It is desired that the response be made by turning transistor 97 on, and that it be made only when the difference between the "max." and the "min." is such as to characterize the presence of intelligence signals. If contact 96 were placed at point 92, then the differential amplifier would respond to noise alone. Contact 96 is referred to as the "squelch adjustment," which can be adjusted by the operator to establish the desired threshold.

Now, when voice signals are received, a pronounced difference between the voltage at points 93 and 92 appears, and the potential at contact 96 is relatively more positive than point 93. The adjustment of the potentiometer comprising the elements 95 and 96 is established so as to cause the normally cut-off transistor 97 to become conductive at a desired or specified ratio of received signal plus noise/noise. For example, a ratio of 6 decibels is used in one successful embodiment of the invention. The rendering conductive of transistor 97 causes the squelch gate 27 (FIG. 2) to be placed in signal-passing condition, as will be described later.

Having made reference to the functions of the differential amplifier, the description now proceeds to its construction. It comprises a combination of transistors 97 and 98, each having its own collector resistor 99 or 100 between collector and line 45, and each having a resistor 101 or 102 in series with its base. The "max." side or base circuit of NPN transistor 97 is completed by a connection of resistor 101 to adjustable contact 96. The base circuit of transistor 98 is completed by a connection of resistor 102 to "min." output point 93.

It will be noted in passing that "hold" circuitry is associated in the upper right part of the FIG. 3 diagram with transistor 109, and that threshold-shifting circuitry comprising transistor 103 is associated with the emitter circuits of the transistors 97 and 98, for purposes presently described.

In series with the emitters of both transistor 97 and transistor 98 is a resistor 104 paralleled by the collector-emitter circuit of NPN transistor 103, which has its collector connected to the emitters of transistors 97 and 98 and its emitter encircuited to ground via a resistor 105.

At this stage of the discussion let certain of the system requirements be considered more rigorously. First of all, as illustrated in FIG. 1, the function of the entire system there shown is to place a squelch gate 27 in signal-passing condition or signal-blocking condition. This is accomplished through the development and control of suitable potentials across resistor 113 (FIG. 3) by reason of collector current flow in transistor 109, which transistor has an input coupled to transistor 97. It will be understood that the two output lines 115 (FIGS. 1, 2, and 3) are applied to a squelch gating circuit 27 of conventional character, FIG. 3 illustrating a squelch gate control system. Now, PNP transistor 109, arranged with its emitter-collector circuit in series between line 45 and resistor 113, is the specific transistor which immediately performs the function of placing gate 27 in signal-passing condition or signal-blocking condition. Whether or not the squelch gate will be open or closed depends on the magnitude of collector current flow of that transistor passing through load resistor 113.

The output point of the control system of FIG. 3 is numbered 106, and, to provide feedback, this point is connected to the base of transistor 103 by line 114 and a resistor 107. Note the hysteresis feedback line 114 in FIGS. 2 and 3.

The signal-to-noise ratio of speech contaminated with noise varies considerably from word to word and even during any particular word. Squelch control of a receiver should not be based on an "instantaneous" signal-to-noise condition with a fixed on-off threshold setting. This problem is solved here by using predetermined signal-to-noise ratio conditions to place the squelch gate in signal-passing condition and using hold and feedback hysteresis circuitry to maintain operation. Feedback hysteresis increases the sensitivity of the differential amplifier such that lower signal-to-noise ratio signals will maintain squelch gate operation. This technique also affords the capability of providing an adjustment of contact 96 for setting the squelch signal-to-noise turn-on ratio.

It having been pointed out that the function of the FIG. 3 system is to control the opening and closing of the squelch gate 27, let attention now be directed to the mode and manner in which it is kept in signal-passing condition. Two aspects of the invention are now presented. The first aspect resides in the fact that, whenever the squelch gate is placed in signal-passing condition, it is not only kept in that condition as long as any signal intelligence is being received, but, in addition, it is kept in that condition for a predetermined hold period following the cessation of any signal intelligence. In other words, once transistor 109 is driven into saturation it must maintain its collector current flow for a predetermined time after the last signal intelligence is received. The second aspect is this: once the squelch gate is placed in signal-passing condition, then the sensitivity of the system should be increased during signal reception and also during the hold period mentioned above. In other words, the threshold should be automatically lowered. Restating this requirement, as the squelch gate 27 is placed in signal-passing condition to receive intelligence signals, the gate control circuit must quickly be made capable of responding at a lower level input in order to keep the gate in signal-passing condition until the signals cease. After they cease, as was indicated in the statement of the first requirement, the gate is kept in signal-passing condition for a clocked period. The reception of noise only during that period must cause a "drop out" with a return of the gate to signal-blocking condition and a resetting and restoration of the original threshold.

The transistor 109 and its associated components provide the hold or clock function, and the transistor 103 and its associated components perform the threshold shifting operation. The description next proceeds to the details of these two transistor circuits, with passing comment on the fact that, speaking in gross, transistor 97 controls transistor 109, which in turn controls transistor 103, which in turn controls transistor 97, with relationships now described.

Referring now to the hold circuitry, the squelch gate is kept in signal-passing condition as long as any signal intelligence is being received. Note is now made of the series combination of diode 111 and resistor 112 between the base of transistor 109 and collector of transistor 97, the cathode of the diode being connected to the collector of transistor 97. In order to keep the squelch gate in signal passing condition for a predetermined period following the cessation of reception of intelligence signals, transistor 109 is held in a saturated condition for a period equal to several time constants of the resistance-capacitance circuit 112, 110. This time constant circuit, comprising resistor 112 and capacitor 110, is inserted between the base and the emitter of transistor 109, the emitter being connected directly to line 45.

In the discussion which follows, the quantities and values mentioned and the wave forms are set forth for purposes of illustration, and are believed to be helpful in explaining principles of operation.

Assuming transistor 97 to have conducted in a manner appropriate to have charged capacitor 110 to approximately 3.8 volts (FIG. 13), and then to have been turned off, the discharge of the energy stored in capacitor 110 will maintain collector current in transistor 109 for a predetermined period following the cut-off of transistor 97, a period of 2.5 seconds being found suitable in one successful embodiment of the invention.

Figure 12:
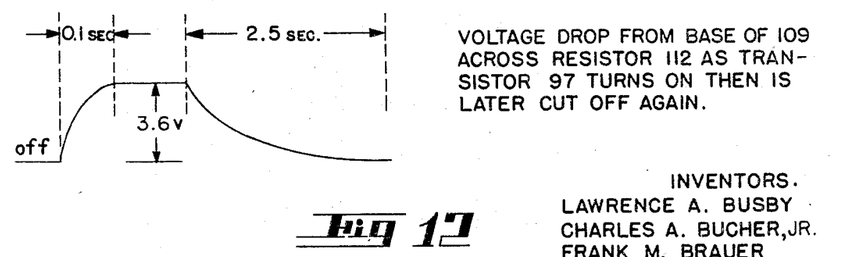

The sloping portion of the wave form on the right side of FIG. 12 illustrates the voltage drop across resistor 112 during this period of 2.5 seconds when transistor 109 remains conductive following cut-off of transistor 97. FIG. 12 indicates that a maximum of about 0.36 milliampere of base current flows through resistor 112 during the fully on phase of operation of transistor 109. While it requires 0.025 second for the current to build up in transistor 109 under full-on conditions, the collector current continues to flow for approximately 2.5 seconds after the cut-off of transistor 97. During approximately half of this 2.5 second turn-off period, the voltage output of the unit, which appears across resistor 113, is sufficient to keep the squelch gate in signal-passing condition. The period of 1.25 seconds has been shown to be adequate to cover periods of hesitation or contemplation on the part of an operator or announcer transmitting voice over a single sideband radio link. That is to say, the gate is kept in signal-passing condition by a positive voltage across resistor 113 during these normally expected pauses in transmission.

Diode 111 prevents loading by resistor 99 when capacitor 110 is discharging.

Another system requirement here involved is this: once the squelch gate is in signal-passing condition—i.e., when the input signals have reached the threshold required to place the squelch gate in signal-passing condition—then the sensitivity of the system should be increased during signal reception. In other words, the threshold should be automatically lowered. Restating this requirement, as the squelch gate is in signal-passing condition to receive intelligence signals, the gate control circuitry must quickly be made capable of responding at a lower level input to keep the gate in that condition until the signals cease. After they cease, as has been demonstrated, the gate is kept in that condition for a clocked period and is then closed. The reception of noise only during that predetermined period must not only cause the gate to close, but also cause the original threshold to be restored.

Explanation of the automatic variation of the threshold is described by considering the events which occur when transistor 97 is switched into the conductive state by the reception of signals attaining the threshold value.

The events here described relate to threshold conditions, and, again, the specific times and figures mentioned are given for purposes of illustration and not of limitation.

Figure 7:
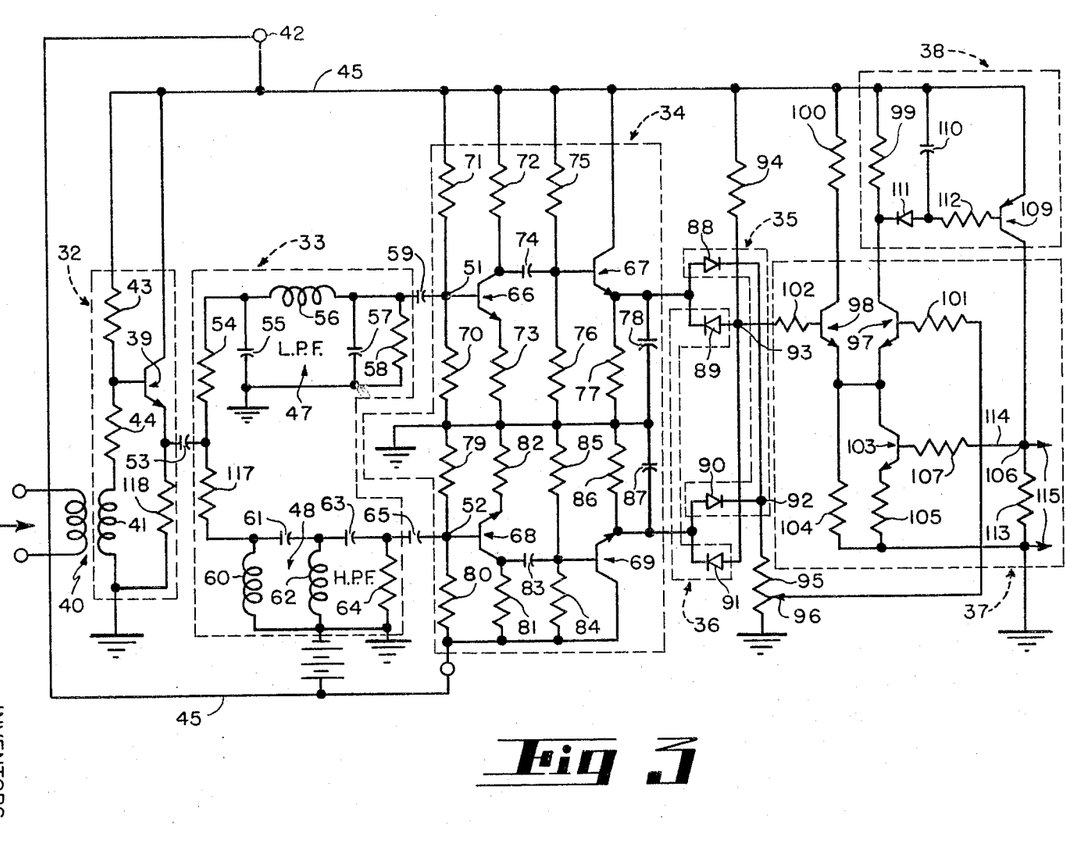
Figures 7, 8:
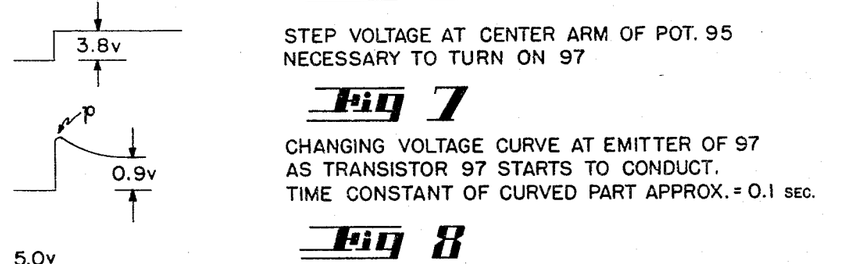
Figure 9:
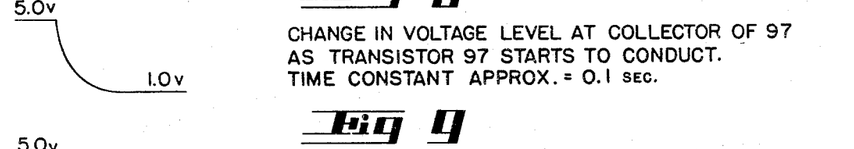
Figure 10:
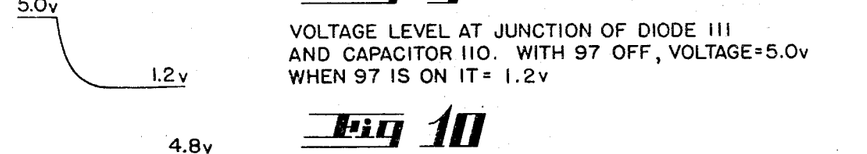
Figure 11:
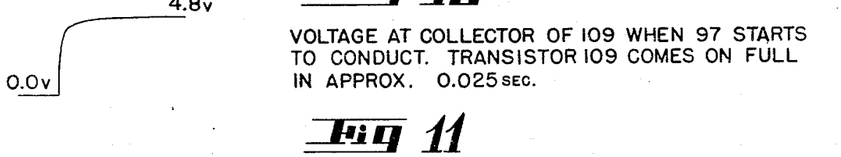

As transistor 97 becomes conductive, there is a sudden increase in the voltage drop across resistor 104, as illustrated by point $p$ in FIG. 8. Parenthetically, in the illustrative embodiment reduced to practice, the emitter output wave form of transistor 67 (FIG. 6) is shown with a rise time of 2 milliseconds and a fall time constant of 100 milliseconds. The intelligence signals switch transistor 97 into the conductive state by causing an increase in potential at contact 96. This is accompanied by a drop in the collector voltage of transistor 97, current now flowing through resistor 99. This drop in voltage at the collector of transistor 97 allows current to flow through transistor 109. The collector current of transistor 109 builds up in a period on the order of 0.025 second whenever transistor 97 remains conductive for that period or longer. The "turn on" voltage wave form for the collector of transistor 109 is illustrated in FIG. 11. The current through transistor 109 develops at an increasing rate due to the build-up of forward bias between the base and emitter of transistor 109. The voltage wave form present at the junction of resistor 112 and capacitor 110 is illustrated in FIG. 10. When transistor 97 is off, this voltage returns to 5 volts. When transistor 97 is on, it is 1.2 volts (FIG. 10).

While the threshold level of the differential amplifier is controlled by transistor 103, this transistor is in turn controlled by transistor 109. The base of transistor 103 is connected via resistor 107 to the collector of transistor 109, whereby the build-up of current in transistor 109 increases the conductivity of transistor 103 and reduces the emitter-to-ground impedance of transistors 97 and 98, thereby substantially lowering the threshold and satisfying the second system requirement discussed above.

A certain increment of voltage at contact 96 is originally required to render transistor 97 conductive. That increase in voltage is applied to transistor 97 at an instant when transistor 103 is off, assuming conditions existing when signals are first received. Transistor 97 is rendered conductive when the threshold is reached. Now, it is reiterated that the invention provides circuitry which operates in such a manner that a lessor voltage is required to keep transistor 97 conductive under this condition: that transistor 109 has turned on transistor 103, with resultant increased emitter current flow in transistor 97. That is to say, the threshold level of the differential amplifier is lowered by rendering transistor 103 conductive. Transistor 103 is rendered conductive only when transistor 109 becomes conductive.

Reference is now made to FIG. 8, which shows the drop in emitter voltage of transistor 97 which accompanies the turn-on of transistor 103. Thus it will be seen that the invention provides the required automatically varying threshold.

Transistor 109 is not triggered into saturation whenever transistor 97 becomes conductive. Each period of conductivity of transistor 97 is accompanied by an increment of charge across capacitor 110. When one of these increments, or a succession of such increments, as illustrated in the wave form of FIG. 13, attains the value of approximately 0.4 volt, then transistor 109 becomes saturated.

Figures 5, 13:
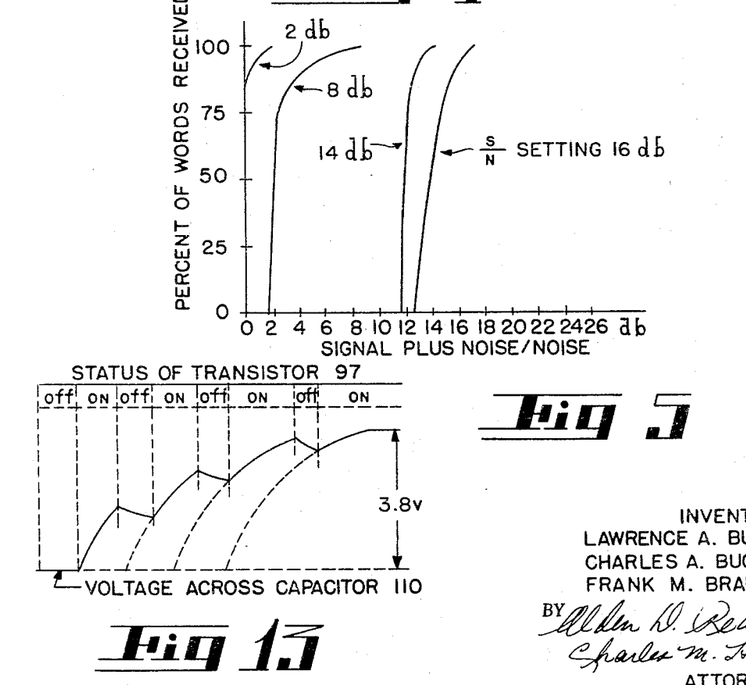
FIG. 5 shows performance curves for various settings of the squelch control.
FIG. 13 is a condenser-charge voltage wave form to which reference is similarly made.

FIG. 13 illustrates the manner in which the charge builds up in capacitor 110 during a series of on-off cycles of transistor 97.

Let there now be considered the circumstance under which speech modulation is received during the 1.25 second interval in which the squelch gate is held in signal-passing condition following cessation of conductivity of transistor 97. During the "on" cycle of transistor 97, capacitor 110 receives an increment of charge.

The wave shape of FIG. 13 illustrates that the clock including transistor 109 is fully reset when a sufficient number of signal pulses (above the signal-plus-noise to noise ratio preselected by adjustment of tap 96, FIG. 3) are received to fully charge capacitor 110.

Now let there be considered the events occurring when the gate is placed in signal-blocking condition by the drop in current flow through transistor 109. The base of transistor 103, being encircuited with the collector of transistor 109, then becomes less positive in potential, and transistor 103 is cut off, thereby restoring the threshold to the normal level.

Referring again to the block diagram of FIG. 2, it will now be understood that block 38 corresponds to the transistor 109 and associated circuitry. The hysteresis feedback line illustrated in FIG. 2 corresponds to the line 114 in FIG. 3. The automatic threshold setting device is, of course, the transistor 103. FIG. 3 comprises the contents of the block 28 of FIG. 1.

The discussion now returns to a further consideration of the differential amplifier including the transistors 97 and 98. This differential amplifier measures the ratio of signal plus noise to noise, signal plus noise being applied to the transistor 97 side from the maximum detector, and noise being applied to the transistor 98 from the minimum detector. As has previously been stated, when this ratio attains a predetermined value, transistor 97 becomes conductive. It will be understood that an increment of voltage which causes the base of transistor 97 to go more positive produces a like effect to a decrement of voltage which causes the base of transistor 98 to go less positive.

Reference has been made to the squelch adjustment 96 of FIG. 3. The four curves in FIG. 5 illustrate performance for various settings of adjustable contact 96. The progression of curves to the right corresponds with settings of contact 96 moving progressively toward ground. The percentage of words received refers to the number of words correctly received for any given signal plus noise/noise ratio. For example, when the squelch adjustment is set at 16 decibels, 100% of all the words in a message are received without any interference by the squelch gate when the signal plus noise/noise ratio is 16 decibels. When the squelch adjustment is set at 2 decibels, 100% of the words are received when the signal plus noise/noise ratio is 2 decibels. When the squelch adjustment is set at 8 decibels, 100% of the words are received when the signal plus noise/noise ratio is 8 decibels. As previously indicated, adjustment is made by positioning contact 96 along resistor 95 (FIG. 3).

In greater detail, the point will be made below that the two band pass filter channels herein shown are illustrative, and that the minimum number of band pass filters such as 47 and 48 is two. However, it is appropriate to use additional band pass filters. For example, six may be employed to cover the audio band pass from 500 cycles per second to 3500 cycles per second. The maximum number of filters is limited by practical reasons such as space, weight, and response time.

It will of course be understood that, while the circuitry in the specific embodiment herein illustrated is transistorized, the invention contemplates the usage of vacuum tubes as well.

It is within the purview of the present invention to provide a system including more than two filter channels, two "max." diodes and two "min." diodes. For example, in lieu of filter 47 there can be provided a plurality of filters, each obtaining its input from the driver amplifier and each applying its output to an individual amplifier-envelope detector network similar to the circuit of transistors 66 and 67. The additional filter would feed into an additional "max." diode in parallel with diodes 88 and 90, and an additional "min." diode in parallel with diodes 89 and 91. The above-mentioned additional filters would be characterized by a pass band different from the filter 47. In the same manner such further filters could be parallel between the output of the driver amplifier and the "min." and "max." output points 93 and 92, whereby the signal spectrum could be sampled in as many areas as there are filters 47 and so on.

It should be understood that the embodiment herein shown and the parameters herein mentioned are by way of illustration and not of limitation, and the specific two-filter approach herein described in detail is not intended to be a limitation on the fundamental invention herein disclosed.

It has been pointed out above that the detected outputs of the band pass filters (such as 47 and 48) are equated in the presence of noise alone and that the presence of speech upsets this balance. It has been pointed out that outputs of some filters will be increased, due to the concentration of speech power in their band passes. Outputs of other filters may stay the same, noise only being present, and they can decrease if sufficient signal is received to cause receiver automatic gain control action (as by 29, FIG. 1). This accounts for the statement made above that whenever noise signal data are present, the D.C. voltage level at the emitter of transistor 67 may be higher or lower than the D.C. level present at the emitter of transistor 69.

In determining the number of band pass filters, such as 48 and 47, to use, the minimum number of filters is two. It may be observed that the maximum voltage at point 96 represents signal plus noise and the minimum voltage at point 93 represents noise only. The differential amplifier subtracts these voltages to obtain an output representing signal presence.

Thus it will be seen that in accordance with the invention there is provided, in a receiver of electromagnetic wave signals whose energy-frequency spectrum is changing at a rate lower than the rate of change of the energy-frequency spectrum of noise, the improvement which comprises, in combination: Means for detecting the maximum signals present in a plurality of portions of the spectrum, means for detecting the minimum signals present in a plurality of portions of the spectrum, the outputs of these means being substantially balanced in the presence of noise alone, and means for sensing a disturbance in this balance occasioned by the presence of intelligence signals. The means for detecting this disturbance is the differential amplifier. The means for recognizing the maximum signals comprises the diodes such as 88 and 90. The means for recognizing the minimum signals comprises the diodes such as as 89 and 91. In the invention a plurality of means is employed for sampling a like plurality of portions of the spectrum. One of these means is the low pass filter 47 and the elements in cascade therewith out to the emitter circuit of transistor 67. Another of these means is the filter 48 and the elements in cascade therewith out to the emitter circuit of transistor 69. The differential amplifier is a threshold device and it responds to a predetermined difference between the maximum and minimum signals for placing in signal-passing condition a squelch gate device 27.

In the working embodiment of the invention described above, the following circuit parameters were found to be acceptable:

Resistors:                                            Ohms
43 ______________________________________  11,000
44 ______________________________________  15,000
118 _____________________________________   1,000
117 _____________________________________   1,000
54 ______________________________________   1,000
58 ______________________________________   1,000
64 ______________________________________   5,000
70 and 79, each _________________________  11,000
71 and 80, each _________________________  56,000
73 and 82, each _________________________     100
72 ______________________________________   3,000
81 ______________________________________   3,000
76 and 85, each _________________________  20,000
75 and 84, each _________________________ 100,000
77 and 86, each _________________________  10,000
94 and 95, each _________________________ 250,000
101 and 102, each _______________________  15,000
99 and 100, each ________________________   4,700
112 _____________________________________  10,000
113 _____________________________________   4,700
104 _____________________________________   3,300
105 _____________________________________   1,000
107 _____________________________________ 100,000

Transistors:                                          Type
39 ______________________________________  MM-513
66 ______________________________________  MM-513
68 ______________________________________  MM-513
67 ______________________________________  MM-513
69 ______________________________________  MM-513
97 ______________________________________  MM-513
98 ______________________________________  MM-513
103 _____________________________________  MM-513
109 _____________________________________  2N-700

Diodes:
88 ______________________________________  DR-305
89 ______________________________________  DR-305
90 ______________________________________  DR-305
91 ______________________________________  DR-305
111 _____________________________________  DR-305

Voltage at terminal 42 ______________________ +5 volts

Capacitors: Microfarads
- 53 _________________________________ 4
- 55 and 57, each _________________________ 16
- 59 and 65, each _________________________ 4
- 61 _________________________________ .034
- 63 _________________________________ .055
- 74 and 83, each _________________________ 4
- 78 and 87, each _________________________ 10
- 110 _________________________________ 30

Inductors: Millihenries
- 56 _________________________________ 318
- 60 _________________________________ 40
- 62 _________________________________ 24

While there has been shown and described what is at present considered to be the preferred embodiment of the invention, it will be obvious to those skilled in the art that various modifications and changes may be made therein without departing from the true scope of the invention as defined by the appended claims.

We claim:

1. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means coupled to all of the sampling means for recognizing and selecting the maximum one of signal outputs of the sampling means, means coupled to all of the sampling means for recognizing and selecting the minimum one of the signal outputs of the sampling means,
   and means for comparing the selected signal outputs.

2. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means coupled to all of the sampling means for recognizing and selecting the maximum one of signal outputs of the sampling means, means coupled to all of the sampling means for recognizing and selecting the minimum one of the signal outputs of the sampling means,
   and differential amplifier means for comparing the selected signal outputs.

3. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means including diodes poled alike and individually coupled to the sampling means for recognizing the maximum signal in the outputs of the sampling means,
   means including diodes poled alike but opposite to the first-named diodes for recognizing the minimum signal in the outputs of the sampling means,
   and differential amplifier means for comparing said maximum and minimum signals.

4. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means coupled to all of the sampling means for recognizing and selecting the maximum one of the signals in the outputs of the sampling means,
   means coupled to all of the sampling means for recognizing and selecting the minimum one of the signals in the outputs of the sampling means,
   and differential amplifier means for comparing the selected signal outputs,
   the sampling means and differential amplifier means being proportioned to produce no output in the presence of white noise and the absence of intelligence signals.

5. In a receiver of electromagnetic wave signals whose energy-frequency spectrum is changing at rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means coupled to all of the sampling means for recognizing and selecting the maximum one of the signals in the outputs of the sampling means,
   means coupled to all of the sampling means for recognizing and selecting the minimum one of the signals in the outputs of the sampling means,
   and means including a threshold device responsive to a predetermined difference between the selected maximum and minimum signals for producing a control effect.

6. In a receiver of electromagnetic wave signals whose energy-frequency spectrum is changing at a rate lower than the rate of change of the energy-frequency spectrum of noise, said receiver including a squelch device, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means coupled to all of the sampling means for recognizing and selecting the maximum signal in the outputs of the sampling means,
   means coupled to all of the sampling means for recognizing and selecting the minimum signal in the outputs of the sampling means,
   and means including a threshold device responsive to a predetermined difference between the selected maximum and minimum signals for placing the squelch device in its signal-passing condition.

7. The combination in accordance with claim 6 in which the last-mentioned means further comprises a holding device controlled by the threshold device to place the squelch device in signal-passing condition and to keep it in that condition for a predetermined time after cesation of intelligence signals.

8. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   maximum-minimum detector means coupled to all of the sampling means for recognizing and selecting the maximum and minimum signal outputs of the sampling means,
   and means for comparing the selected maximum and minimum signal outputs.

9. In a receiver of electromagnetic wave signals whose energy-frequency spectrum is changing at a rate lower than the rate of change of the energy-frequency spectrum of noise, the improvement which comprises, in combination:
   means including filters for providing signals in a plurality of portions of the spectrum,
   means coupled to all of said filters for detecting the maximum signals present in said plurality of portions of the spectrum,
   means coupled to all of said filters for detecting the minimum signals present in said plurality of portions of the spectrum,
   the outputs of these means being substantially balanced in the presence of noise alone,
   and means for sensing a disturbance in this balance occasioned by the presence of intelligence signals.

10. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means for recognizing the maximum signal in the outputs of the sampling means,
   means for recognizing the minimum signal in the outputs of the sampling means,
   means including a threshold device responsive to a predetermined difference between said maximum and minimum signals for producing a control effect, and
   shifting means for lowering said threshold, once said predetermined difference is attained.

11. In a receiver of electromagnetic wave signals whose energy-frequency spectrum is changing at a rate lower than the rate of change of the energy-frequency spectrum of noise, said receiver including a squelch device having signal-passing and signal-blocking states, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   means for recognizing the maximum signal in the outputs of the sampling means,
   means for recognizing the minimum signal in the outputs of the sampling means,
   means including a threshold device responsive to a predetermined difference between said maximum and minimum signals for placing the squelch device in its signal-passing state, the last mentioned means further comprising a holding device controlled by the threshold device to place the squelch device in its signal-passing condition and to keep it in that condition for a predetermined time after cessation of intelligence signals,
   and shifting means for lowering said threshold, once said predetermined difference is attained because of the presence of received intelligence signals.

12. The combination in accordance with claim 11, and a feedback coupling from said holding device to said shifting means for restoring said threshold at a predetermined time following cessation of intelligence signals.

13. In a receiver of electromagnetic wave signals whose energy-frequency spectrum is changing at a rate lower than the rate of change of the energy-frequency spectrum of noise, the improvement which comprises, in combination:
   a plurality of means for sampling a like plurality of portions of the spectrum,
   the sampling means being proportioned to produce equal outputs in the presence of white noise and the absence of intelligence signals,
   means for applying intelligence signals to all of the sampling means,
   a maximum-minimum detector means for recognizing the maximum and minimum signal outputs of the sampling means, the maximum-minimum detector means comprising an "or" gate for recognizing the maximum signal output and an oppositely poled "or" gate for recognizing the minimum signal output, and
   means comprising a differential detector having separate inputs individually coupled to said "or" gates for comparing said maximum and minimum signal outputs.

14. The combination in accordance with claim 13 in which each of the sampling means comprises a band pass filter network having outputs coupled to said "or" gates.

15. The combination in accordance with claim 14 in which each of the sampling means further includes an envelope-detector network between band pass filter network and the "or" gates.

16. The combination in accordance with claim 15 in which each envelope-detector network is provided with a filter load circuit comprising resistance and capacitance having a time constant on the order of the syllabic rate of speech.

17. The combination in accordance with claim 16 in which each of the sampling means further includes an amplifier network between its filter network and envelope-detector network.

18. The combination in accordance with claim 17 in which there are two sampling means, in which the overall pass band characteristic of the receiver going into said band filter network is flat, and in which the band pass filter networks are symmetrically disposed with regard to said band pass characteristic,
   one of said filter networks being low pass and the other filter network being high pass, so that the area between the high frequency portion of the low pass characteristic and the low frequency portion of the over-all band pass characteristic approximates the area between the low frequency portion of the high pass characteristic and the high frequency portion of the over-all band pass characteristic.

19. The combination in accordance with claim 18 in which the means for applying intelligence signals to the sampling means is a common driver amplifier, and in which the sampling means are in parallel with the output of that amplifier.

20. In a wave signal translating system, the combination of
  a plurality of channels having inputs and outputs,
  means comprising a plurality of rectifiers individually connected to said outputs for recognizing the maximum signal in said channels,
  and means comprising a plurality of oppositely poled rectifiers individually connected to said outputs for recognizing the minimum signal in said channels.

21. The combination in accordance with claim 20 and a common output resistor coupled to the first-named rectifiers and another common resistor coupled to the second-named rectifiers.

22. The combination in accordance with claim 21 and a differential amplifier having inputs coupled to said resistors.

References Cited

UNITED STATES PATENTS

| | | | |
|---|---|---|---|
| 2,802,939 | 8/1957 | Klehfoth | 325—478 |
| 3,102,236 | 8/1963 | Eichenberger et al. | 325—478 |
| 3,213,372 | 10/1965 | Kurvits | 325—478 |
| 3,238,457 | 3/1966 | Boymel et al. | 325—474 X |

KATHLEEN H. CLAFFY, *Primary Examiner.*

R. LINN, *Assistant Examiner.*